United States Patent
Wu et al.

(10) Patent No.: US 10,533,911 B2
(45) Date of Patent: Jan. 14, 2020

(54) SIGNAL PROCESSING DEVICE, AIR PRESSURE SENSOR ASSEMBLY AND ELECTRONICS APPARATUS

(71) Applicant: GOERTEK.INC, Weifang, Shandong (CN)

(72) Inventors: Li-Te Wu, Weifang (CN); Ching-Tzung Lin, Weifang (CN); Ssu-Ying Chen, Weifang (CN)

(73) Assignee: GOERTEK.INC, Weifang, Shandong (CN)

( * ) Notice: Subject to any disclaimer, the term of this patent is extended or adjusted under 35 U.S.C. 154(b) by 244 days.

(21) Appl. No.: 15/553,093

(22) PCT Filed: Nov. 4, 2016

(86) PCT No.: PCT/CN2016/104739
§ 371 (c)(1),
(2) Date: Aug. 23, 2017

(87) PCT Pub. No.: WO2018/082051
PCT Pub. Date: May 11, 2018

(65) Prior Publication Data
US 2018/0275002 A1    Sep. 27, 2018

(51) Int. Cl.
*G01L 19/00* (2006.01)
*G01L 9/00* (2006.01)
*G01C 5/06* (2006.01)

(52) U.S. Cl.
CPC ............ *G01L 19/00* (2013.01); *G01C 5/06* (2013.01); *G01L 9/00* (2013.01)

(58) Field of Classification Search
CPC .................................. G01L 9/00; G01L 19/00
USPC ......... 73/1.57, 1.59, 384, 753; 324/613, 614
See application file for complete search history.

(56) References Cited

U.S. PATENT DOCUMENTS

| | | | |
|---|---|---|---|
| 6,377,637 B1 * | 4/2002 | Berdugo | G10L 19/0208 |
| | | | 375/346 |
| 6,421,622 B1 * | 7/2002 | Horton | G01C 21/16 |
| | | | 701/11 |
| 2017/0023429 A1 * | 1/2017 | Straeussnigg | H03M 3/336 |

* cited by examiner

*Primary Examiner* — Benjamin R Schmitt

(57) ABSTRACT

The present invention discloses a signal processing device, an air pressure sensor assembly and an electronics apparatus. The signal processing device for a sensing signal comprises: an input unit, which is configured to receive the sensing signal; and a processing unit, which is configured to attenuate a higher frequency component of the sensing signal so that the value of the higher frequency component when the sensing signal is stable is lower than that when the sensing signal is changing. According to an embodiment of this invention, the present invention can reduce the noise in a sensing signal from an air pressure sensor during a stable state.

8 Claims, 5 Drawing Sheets

SIGNAL PROCESSING DEVICE, AIR PRESSURE SENSOR ASSEMBLY AND ELECTRONICS APPARATUS

CROSS REFERENCE TO RELATED APPLICATION

This application is a national stage application, filed under 35 U.S.C. § 371, of International Application No. PCT/CN2016/104739, filed on Nov. 4, 2016.

FIELD OF THE INVENTION

The present invention relates to the field of signal processing, more specifically, relates to a signal processing device, an air pressure sensor assembly and an electronics apparatus.

BACKGROUND OF THE INVENTION

An air pressure sensor (also called barometer) is an instrument to measure atmospheric pressure. One important application of air pressure sensor is to estimate altitude. FIG. 1 shows the relationship between an elevation above sea level (altitude) in m and an atmospheric pressure (or air pressure). The altitude can be estimated by:

$$H = 44307.7 * [1 - (P/101.325)^{0.190284}] \quad \text{(Equation 1)}$$

where H is altitude, P is air pressure. In this way, an altitude meter can be made with the air pressure sensor. The altitude meter is widely used in hand-held device, drone, air-craft, and so on.

For example, in a drone application, a noise in such a measurement plays an important role. Generally, the noise of air pressure measurement is about 1.2 Pa (Pascal). It corresponds to an altitude error of about 10 cm. It implies that a drone would fly up-and-down randomly in an altitude range of about 10 cm. This up-and-down behavior would increase the probability of crash especially when a drone is flying low.

For example, a Chinese patent application No. 200610161300.3 discloses an error compensation model and algorithm implementation of a high precision pressure sensor, which is hereby incorporated herein by reference.

A U.S. Pat. No. 7,248,703 B1 discloses systems and methods for adaptive noise cancellation, which is hereby incorporated herein by reference.

U.S. Pat. No. 8,612,810 B2, discloses sensor device provided with a circuit for detection of single or multiple events for generating corresponding interrupt signals, which is hereby incorporated herein by reference.

Therefore, there is a demand in the art that a new solution for processing the sensing signal of a sensor shall be proposed to address at least one of the problems in the prior art.

SUMMARY OF THE INVENTION

One object of this invention is to provide a new technical solution for processing signal.

According to a first aspect of the present invention, there is provided a signal processing device for a sensing signal, comprising: an input unit, which is configured to receive the sensing signal; and a processing unit, which is configured to attenuate a higher frequency component of the sensing signal so that the value of the higher frequency component when the sensing signal is stable is lower than that when the sensing signal is changing.

Alternatively or optionally, the processing unit comprises: a band splitting module, which is configured to split the sensing signal into a first sub-band and a second sub-band, wherein the second sub-band is higher than the first sub-band; and an attenuation module, which is configured to attenuate the second sub-band when the sensing signal is stable.

Alternatively or optionally, the attenuation module is configured to cancel the second sub-band when the sensing signal is stable.

Alternatively or optionally, the processing unit comprises: a bandwidth adjusting module, which is configured to expand the bandwidth for the sensing signal when the sensing signal is changing.

Alternatively or optionally, the processing unit comprises a band splitting module which is configured to split the sensing signal into a first sub-band and a second sub-band, wherein the second sub-band is higher than the first sub-band and the bandwidth adjusting module is configured to expand the bandwidth of the first sub-band when the sensing signal is changing.

Alternatively or optionally, the signal processing device further comprises: a detector, which is configured to detect the changing of the sensing signal.

Alternatively or optionally, the detector receives the sensing signal before it is converted into a digital signal.

Alternatively or optionally, the signal processing device further comprises: a command input, which receives a command signal causing a changing of the sensing signal the sensing signal; wherein the processing unit determines that the sensing signal is changing when receiving the command signal.

According to a second aspect of the present invention, there is provided an air pressure sensor assembly, comprising: an air pressure sensor; and the signal processing device according to the present invention.

According to a third aspect of the present invention, there is provided an electronics apparatus, comprising an air pressure sensor assembly according to the present invention.

According to an embodiment of this invention, the present invention can reduce the noise in a sensing signal from an air pressure sensor during a stable state.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
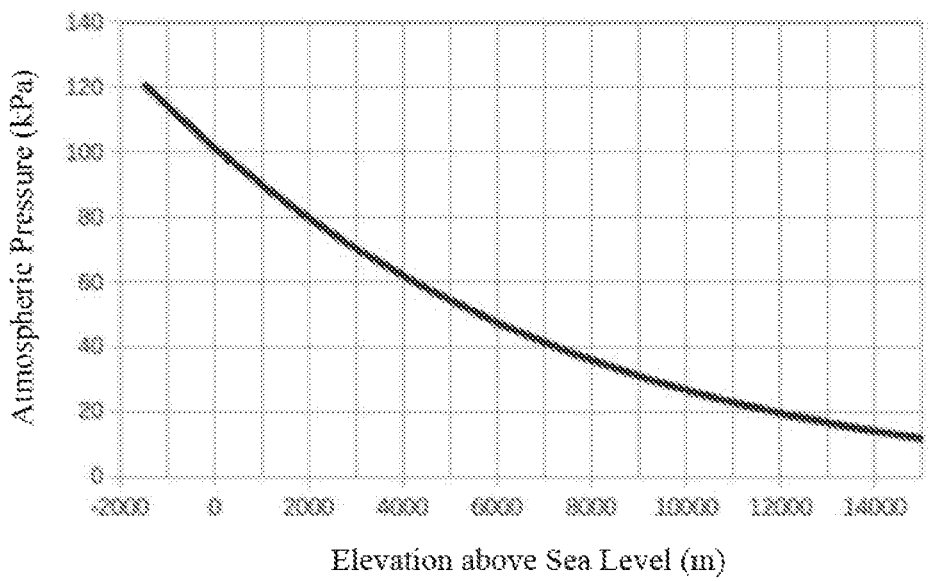
FIG. 1 is a schematic diagram showing the relationship between air pressure and altitude.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Figure 2:
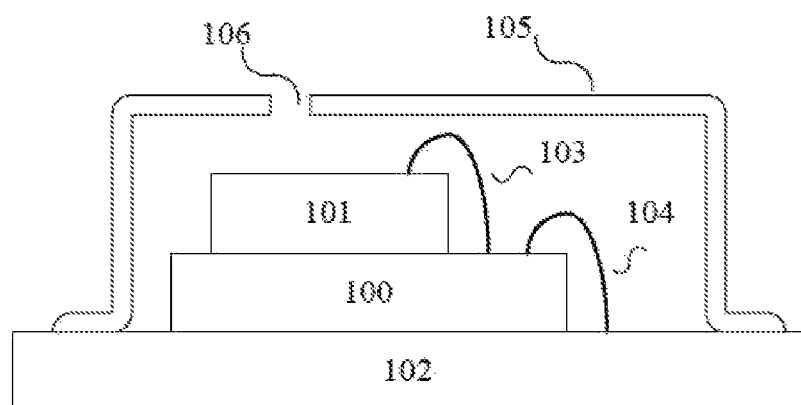
FIG. 2 is a schematic block diagram of a pressure sensor assembly of the prior art.

FIG. 2 is a schematic block diagram of a pressure sensor assembly. Generally, the pressure sensor assembly includes an air pressure sensor 101, a signal processing device (read out circuit) 100 for the sensing signal from the air pressure sensor and a substrate 102. The sensing signal is processed by the signal processing device 100 and then is output to the circuit on the substrate 102 for further processing. The air pressure sensor 101, the signal processing device 100 and the substrate 102 are connected with each other via bonding wires 103, 104. The pressure sensor assembly can further include a cap 105. The cap 105 has a hole 106, for example, so that the air pressure sensor 101 can sense an air pressure. The cap 105 can protect the air pressure sensor 101 and the signal processing device 100 therein.

The air pressure sensor 101 can be any sensor that can sense the air pressure. For example, it can be a MEMS device, an aneroid barometer and so on.

Figure 3:
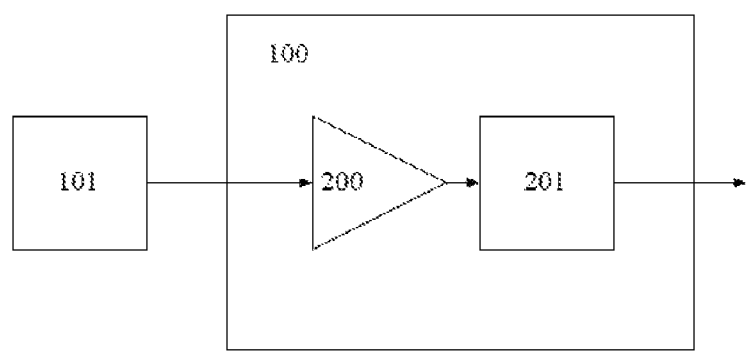
FIG. 3 is a schematic block diagram of readout device of the prior art.

As shown in FIG. 3, the signal processing device 100 can further comprises an amplifier 200 and an AD converter 201. The amplifier 200 receives a sensing signal output from the air pressure sensor 101 and amplifies the sensing signal. The AD converter 201 converts the amplified sensing signal into digital signal. The signal processing device 100 is used to read the sensing signal and thus can also be called as readout, circuit.

The signal processing device 100 can include discrete components or can be one or more integrated circuits. It can also be a processor under control of software. These implementations are well-known in the art. Under the teaching of a technical solution, a person skilled in the art can choose how to implement it based on commercial concerns such as cost, speed, size, availability on the market and so on. This description will not limit a technician in this respect.

Figure 4:
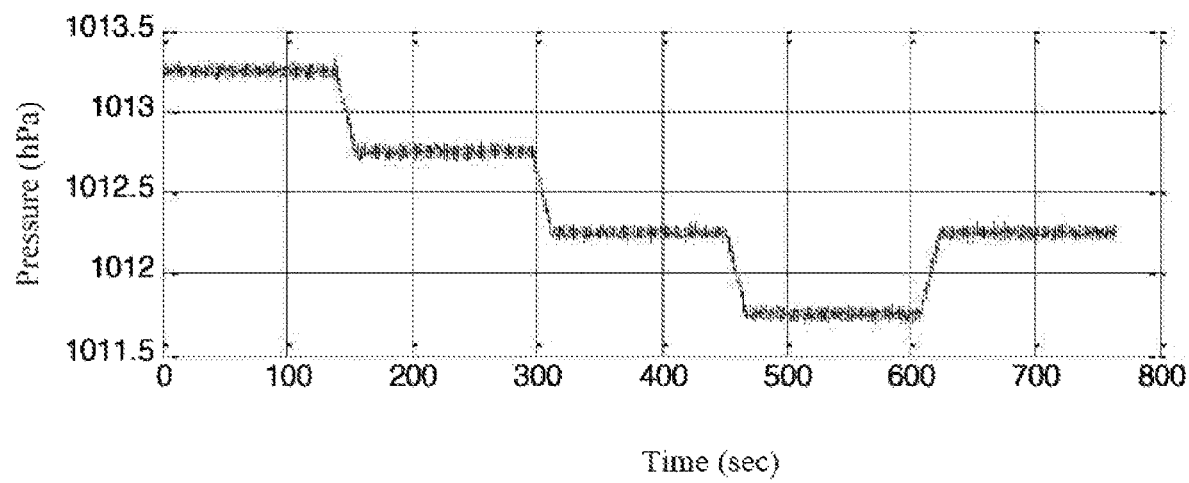
FIG. 4 is an illustrative graph of an air pressure sensing signal output by a prior art air pressure sensor assembly.

FIG. 4 shows an illustrative graph of an air pressure sensing signal output by a prior art air pressure sensor assembly. As shown in FIG. 4, the sensing signal contains noise, especially when the sensing signal is stable or in a stable status, such as during the period of 0~100 sec. Here, the stable status means that the altitude does not change and the sensing signal would be constant or change within a predetermined rate if there is no noise.

As explained previously, the noise is harmful and may cause damage to the electronics apparatus which adjusts its flying level based on the output of the air pressure sensor.

The inventor of this invention has observed the figure and has found that the noise has a frequency higher that that of the actual sensing signal (sensing signal without noise). In this regard, the SNR will be improved if the higher frequency component is reduced. However, this will delay the response of the sensor to an altitude changing.

Figure 5:
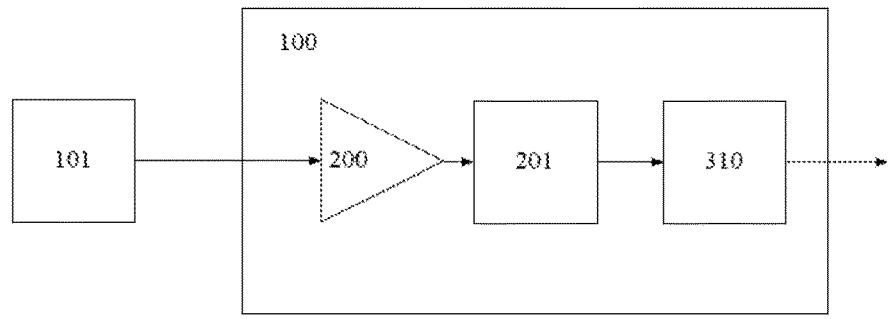
FIG. 5 is a schematic block diagram of an air pressure sensor assembly according to an embodiment of the present invention.

FIG. 5 shows a schematic block diagram of an air pressure sensor assembly according to an embodiment of the present invention. As shown in FIG. 5, the air pressure sensor assembly includes an air pressure sensor 101 and a signal processing device 100.

As shown in FIG. 5, the signal processing device 100 receives a sensing signal form the air pressure sensor 101. The sensing signal is received by an input unit of the signal processing device 100. For example, the input unit may include an amplifier 200 and an AD converter 201. A person skilled in the art can conceive various input means. This present invention is not limited in this respect and thus more detailed description will be omitted.

The sensing signal is processed in the input unit such as the amplifier 200 and the AD converter 201 and then is input into a processing unit 310. The processing unit 310 is configured to attenuate a higher frequency component of the sensing signal so that the value of the higher frequency component when the sensing signal is stable is lower than that when the sensing signal is changing. Here, by attenuation, the value of the higher frequency component can be reduced to zero.

The sensing signal can be divided into multiple frequency components. At least one component is higher than the lowest frequency components. For example, it can be attenuated during a stable state. For example, the value of the higher frequency component can be the amplitude of the component.

Here, the "stable" means that the sensing signal shall be constant or change within a predetermined rate if there was no noise. A designer can define the changing rate as desired. For example, it is less than 12 Pa/sec.

In this embodiment, by attenuating the higher frequency component, the noise can be reduced when the sensing signal is in a stable status. Further, by keeping the higher component of the sensing signal when it is changing, the sensor assembly can provide a rapid response to the change of altitude.

Figure 6:
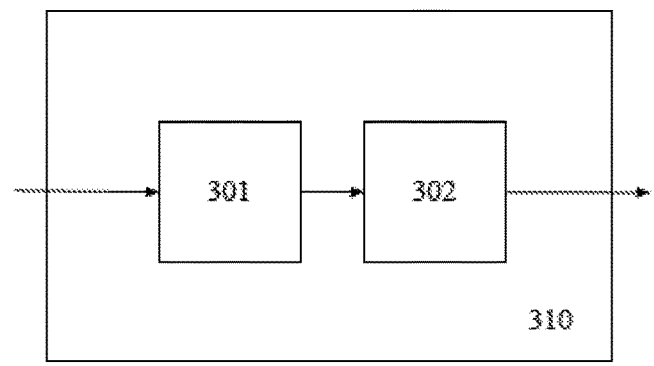
FIG. 6 is a schematic block diagram of a processing unit according to another embodiment of the present invention.

FIG. 6 is a schematic block diagram of a processing unit 310 according to another embodiment of the present invention.

The processing unit 310 can be used in the air pressure sensor assembly as shown in FIG. 5.

As shown in FIG. 6, the processing unit 310 includes a band splitting module 301 and an attenuation module 302.

The band splitting module 301 is configured to split the sensing signal into a first sub-band and a second sub-band, wherein the second sub-band is higher than the first sub-band. The attenuation module 302 is configured to attenuate the second sub-band when the sensing signal is stable. It would be understood by a person skilled in the art, although two sub-bands are described here, the band splitting module 301 can split the sensing signal into more than two sub-bands and more than one higher sub-bands can be attenuated. For example, the attenuation module 302 is configured to cancel the second sub-band when the sensing signal is stable.

Figure 8:
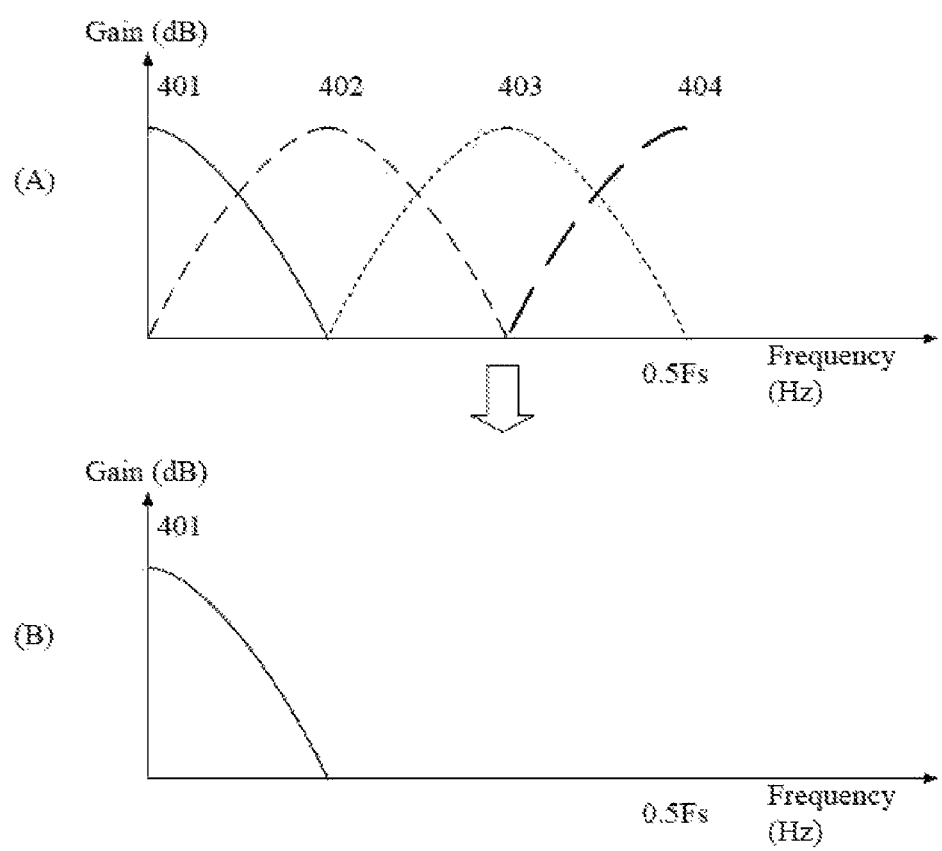
FIG. 8 is an illustrative graph of sub-bands of signal output by a processing unit according to another embodiment of the present invention.

FIG. 8 shows an illustrative graph of sub-bands of signal output by the processing unit 310.

As shown in FIG. 8 (A), the band splitting module 301 can split the sensing signal into four sub-bands 401, 402, 403, 404, for example. The four sub-bands are kept during altitude changing. In FIG. 8 (B), when the sensing signal is stable, the sub-bands 402, 403, 404 are attenuated to zero (cancelled) and the sub-band 401 remains. Although the three higher components 402, 403, 404 are cancelled in this example, it would be understood by a person skilled in the art that attenuation of at least one of them will improve the performance of the sensor assembly.

Figure 7:
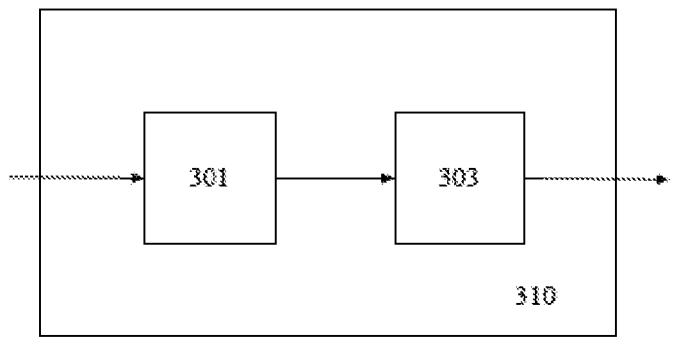
FIG. 7 is a schematic block diagram of a processing unit according to another embodiment of the present invention.

FIG. 7 is a schematic block diagram of a processing unit 310 according to another embodiment of the present invention.

The processing unit 310 includes a bandwidth adjusting module 303. The bandwidth adjusting module 303 is configured to expand the bandwidth for the sensing signal when the sensing signal is changing. By this manner, at least one part of a higher frequency is enhanced during changing. In another word, the value of the higher frequency component when the sensing signal is changing is larger than that when the sensing signal is stable. In this regard, compared with the sensing signal when it is changing, the value of the higher frequency component is attenuated when the sensing signal is stable.

In an example, the processing unit 310 includes a band splitting module 301 and a bandwidth adjusting module 303. The band splitting module 301 is configured to split the sensing signal into a first sub-hand and a second sub-band, wherein the second sub-band is higher than the first sub-band. The bandwidth adjusting module 303 is configured to expand the bandwidth of the first sub-band when the sensing signal is changing.

Figure 9:
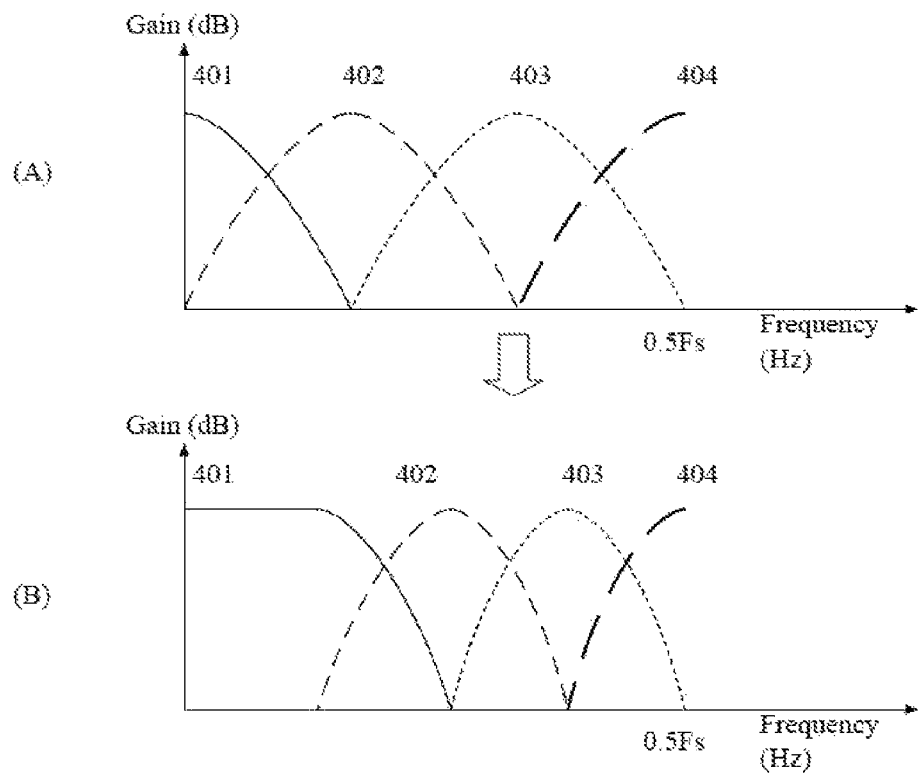
FIG. 9 is an illustrative graph of sub-bands of signal output by a processing unit according to another embodiment of the present invention.

FIG. 9 shows an illustrative graph of sub-bands of signal output by a processing unit 310. As shown in FIG. 9 (A), the band splitting module 301 can split the sensing signal into four sub-bands 401, 402, 403, 404, for example. The four sub-bands are kept during altitude changing. In FIG. 9 (B), during altitude changing, the sub-band 401 is expanded. In this way, although the noise may increase, the response is accelerated during changing.

The embodiments of FIG. 6 and FIG. 7 can be combined. For example, the sensing signal split by the band splitting module 301 can be fed into the attenuation module 302 and the bandwidth adjusting module 303.

In addition, the band splitting module 301, the attenuation module 302 and the bandwidth adjusting module 303 can combined together. For example, they can be implemented in a filter and these modules can be implemented by adjusting the coefficients for the taps of the filter. Under the teaching of this invention, a person skilled in the art will choose suitable implementation for these modules.

Figure 10:
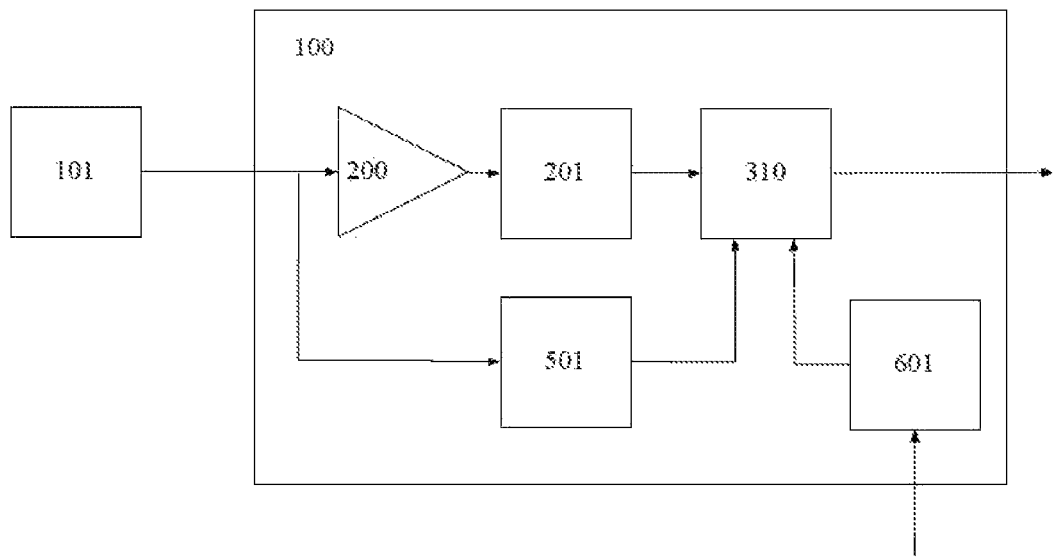
FIG. 10 is a schematic block diagram of an air pressure sensor assembly according to another embodiment of the present invention.

FIG. 10 shows a schematic block diagram of an air pressure sensor assembly according to an embodiment of the present invention.

As shown in FIG. 10, the signal processing device 100 further includes a detector 501. The detector 501 is configured to detect the changing of the sensing signal. For example, the detector 501 receives the sensing signal before it is converted into a digital signal. That is, the detector 501 is fed with the sensing signal before the AD converter 201. In this respect, the detector 501 can detect the changing of the sensing signal in a rapid manner and thus the signal processing device 310 can switch to a changing mode timely.

It would be understood by a person skilled in the art that although the input of the detector 501 is connected before the amplifier 200 in FIG. 10, the input of the detector 501 can also be connected between the amplifier 200 and the AD convertor 201.

Alternatively, the input of the detector 501 can also be connected between the amplifier 200 and the AD convertor can be connected at the output of the AD convertor 201.

In FIG. 10, the signal processing device 100 further includes a command input 601. The command input 601 receives a command signal causing a changing of the sensing signal. The processing unit 100 determines that the sensing signal is changing when receiving the command signal. For example, when the sensor assembly is used in a drone, a user operate a remote control to instruct the drone to fly lower. In this situation, the command of the remote control is sent to the air pressure sensor assembly and is received by the command input 601. The command input 601 forwards signal indicative of altitude changing to the processing unit 310. The processing unit 310 switches to a changing state and prepares for the changing of the sensing signal in advance. In this manner, the processing unit 310 can provide a better response during changing.

It would understood by a person skilled in the art, although the signal processing device 100 includes both the detector 501 and the command input 601 in FIG. 10, it can include one of them, for instance, the detector 501 or the command input 601.

As explained above, it would be understood by a person skilled in the art that the units and modules in the signal processing device 310 can be implemented by discrete components or one or more integrated circuits. They can also be implemented by a processor or a micro-controller under control of software. These implementations are well-known in the art. Under the teaching of this invention, a person skilled in the art can choose suitable manners to implement them, for example, based on commercial concerns such as cost, speed, size, availability on the market and so on. The present invention will not limit a technician in this respect.

Figure 11:
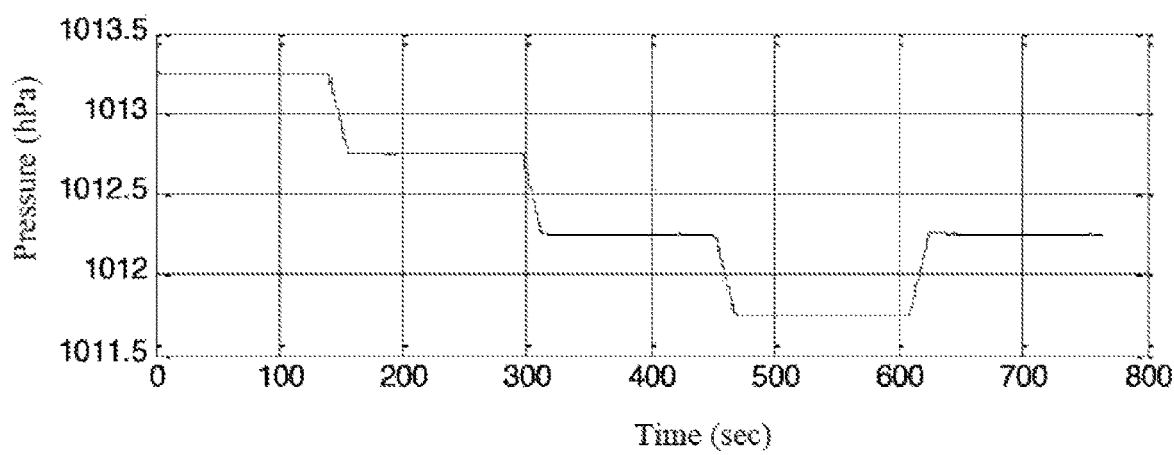
FIG. 11 is an illustrative graph of an air pressure sensing signal output by a signal processing device according to another embodiment of the present invention.

FIG. 11 shows an illustrative graph of an air pressure sensing signal output by a signal processing device according to an embodiment of the present invention. As shown in FIG. 11, the noise is reduced for the stable state, such as the period of 0-100 sec.

Figure 12:
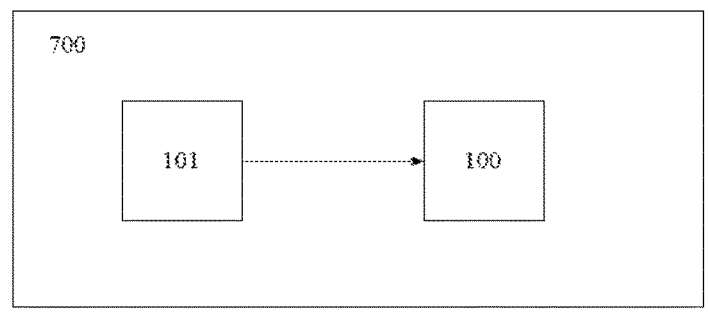
FIG. 12 is a schematic block diagram of an electronics apparatus according to another embodiment of the present invention.

FIG. 12 is a schematic block diagram of an electronics apparatus according to an embodiment of the present invention. As shown in FIG. 12, the electronics apparatus 700 includes an air pressure sensor assembly which may include an air pressure sensor 101 and a signal processing device according to an embodiment of this invention for processing a sensing signal from the sensor 101. The electronics apparatus 700 can be a hand-held device, drone, air-craft and so on.

The inventor of this invention further realizes that although the above is described with reference to an air pressure sensor application, the signal processing device according to the embodiments can also be used in other applications which require a sensing signal with both stable status and changing status. For example, the signal processing device can be used in a posture sensor application such as a self balancing electric vehicle, a robot and so on, or a temperature sensor application such as a temperature adjusting system in a laboratory, an air conditioner for a car and so on.

In this regard, the sensing signal is not limited to a signal from an air pressure sensor. The use of the signal processing device is not limited to a hand-held device, drone, air-craft. It can be used in other electronics apparatus. Therefor, the electronics apparatus can includes a sensor and a signal processing device according to an embodiment of this invention for processing a sensing signal from the sensor.

Although some specific embodiments of the present invention have been demonstrated in detail with examples, it should be understood by a person skilled in the art that the above examples are only intended to be illustrative but not to limit the scope of the present invention.

What is claimed is:

1. A signal processing device for a sensing signal, comprising:
    an input unit, which is configured to receive the sensing signal; and
    a processing unit, which is configured to attenuate a higher frequency component of the sensing signal so that the amplitude of the higher frequency component when the sensing signal is stable is lower than the amplitude of the higher frequency component when the sensing signal is changing;
    wherein the processing unit comprises a band splitting module which is configured to split the sensing signal into a first sub-band and a second sub-band, wherein the second sub-band is higher than the first sub-band, and a bandwidth adjusting module which is configured to expand the bandwidth of the first sub-band when the sensing signal is changing.

2. The signal processing device according to claim 1, wherein the processing unit comprises:
    an attenuation module, which is configured to attenuate the second sub-band when the sensing signal is stable.

3. The signal processing device according to claim 2, wherein the attenuation module is configured to cancel the second sub-band when the sensing signal is stable.

4. The signal processing device according to claim 1, further comprising:
    a detector, which is configured to detect the changing of the sensing signal.

5. The signal processing device according to claim 4, wherein the detector receives the sensing signal before it is converted into a digital signal.

6. The signal processing device according to claim 1, further comprising:
    a command input, which receives a command signal causing a changing of the sensing signal;
    wherein the processing unit determines that the sensing signal is changing when receiving the command signal.

7. An air pressure sensor assembly, comprising:
    an air pressure sensor; and
    the signal processing device according to claim 1.

8. An electronics apparatus, comprising an air pressure sensor assembly according to claim 7.

* * * * *